United States Patent [19]

Marjoram et al.

[11] Patent Number: 4,738,434

[45] Date of Patent: Apr. 19, 1988

[54] VIBRATION AND/OR SHOCK ATTENUATING FLUID MOUNT OR THE LIKE

[76] Inventors: Robert H. Marjoram, 3604 Woodhaven Drive; Richard P. Thorn, 3033 W. 24th St., both of Erie, Pa. 16506

[21] Appl. No.: 848,869

[22] Filed: Apr. 7, 1986

[51] Int. Cl.$^4$ .................. F16F 9/08; F16F 9/06; F16F 9/34; B60G 11/26

[52] U.S. Cl. .................. 267/140.1; 267/35; 248/562; 248/636

[58] Field of Search .............. 267/140.1, 64.24, 64.27, 267/8 R, 35; 188/298, 315, 269, 322.15; 248/562, 636; 180/312; 280/708, 709

[56] References Cited

U.S. PATENT DOCUMENTS

| 3,046,003 | 7/1962 | Schultz | 267/64.24 |
|---|---|---|---|
| 3,202,388 | 8/1965 | Goodwin | 64/26 |
| 3,527,451 | 9/1970 | Long | 188/315 |
| 4,342,446 | 8/1982 | Eaton et al. | 267/35 |
| 4,352,487 | 10/1982 | Shtarkman | 267/35 |
| 4,401,298 | 8/1983 | Eaton | 267/140.1 |
| 4,416,445 | 11/1983 | Coad | 267/35 |
| 4,460,168 | 7/1984 | Obadal | 267/140.1 |
| 4,546,960 | 10/1985 | Abrams et al. | 267/136 |
| 4,632,370 | 12/1986 | Ticks et al. | 267/35 |

FOREIGN PATENT DOCUMENTS

| 3330462 | 3/1985 | Fed. Rep. of Germany | 267/8 |
|---|---|---|---|
| 0113332 | 6/1984 | Japan | 188/322.15 |
| 0040841 | 3/1985 | Japan | 267/140.1 |
| 00478591 | 1/1938 | United Kingdom | 267/64.27 |
| 2027160 | 2/1980 | United Kingdom | 188/282 |
| 8500209 | 1/1985 | United Kingdom | 188/282 |

OTHER PUBLICATIONS

Bernuchon, "A New Generation of Fluid Mounts", SAE Technical Paper, Series No. 840259 (1984).
Flower, "Understanding Hydraulic Mounts for Improved Vehicle Noise, Vibration & Ride Qualities", SAE Technical Paper. Series No. 850975 (1985).

*Primary Examiner*—Andres Kashnikow
*Assistant Examiner*—Richard Potosnak

[57] ABSTRACT

The mount preferably includes a decoupler assembly that causes different degrees of damping of relatively large magnitude excitation forces that result in mount compression versus mount extension, and that causes no or only minimal damping of excitation forces of relatively small amplitude. In a preferred embodiment the mount includes a generally cylindrical double-walled housing having a central portion containing at least part of a first variable volume chamber containing hydraulic fluid, and having an outer portion containing a second variable volume chamber containing gaseous fluid. The second chamber is of annular shape and encircles at least part of the first chamber. A rolling diaphragm defining a boundary of at least one of the chambers is formed of elastomeric material having a layer of reinforcing material preferably disposed at an offset location therein.

14 Claims, 2 Drawing Sheets

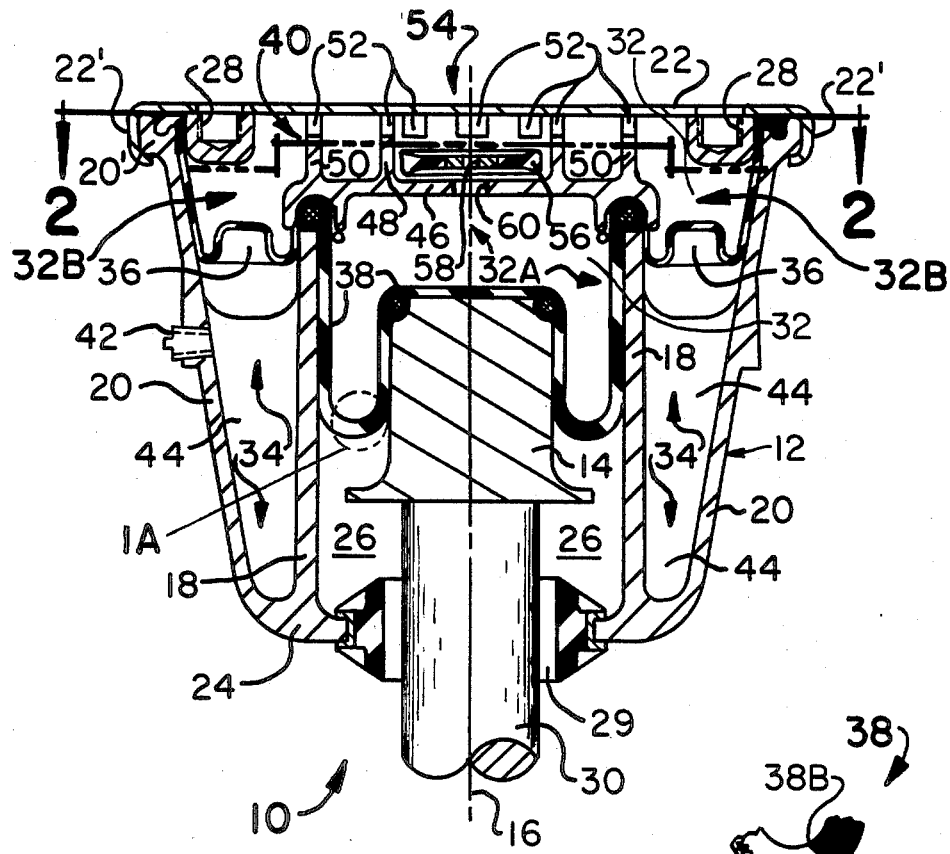
FIGURE 1
FIGURE 1A
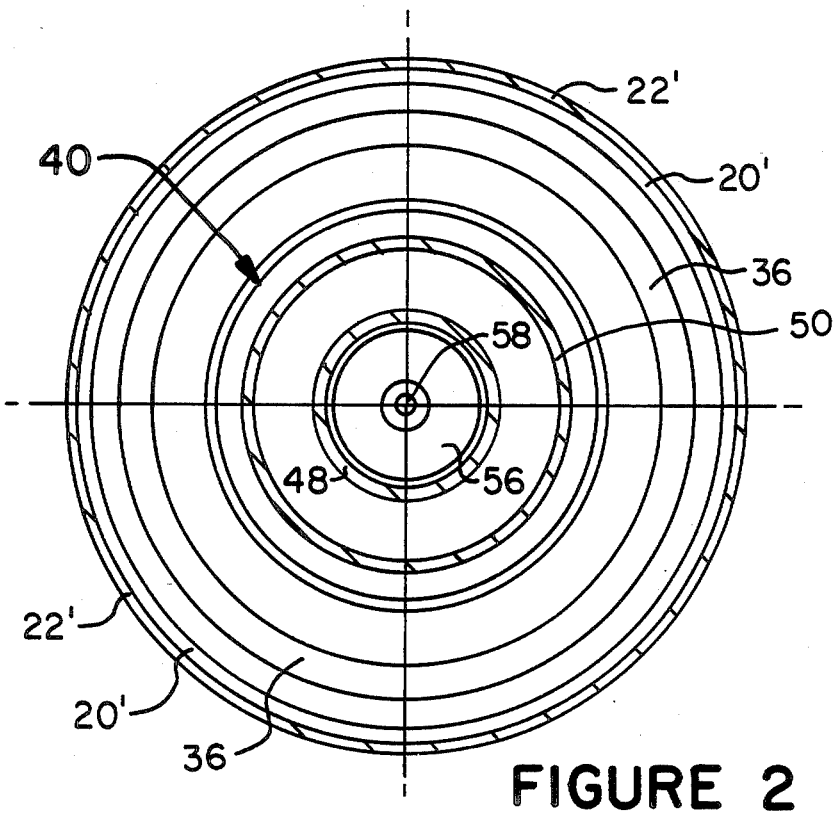
FIGURE 2

VIBRATION AND/OR SHOCK ATTENUATING FLUID MOUNT OR THE LIKE

This invention relates to vibration and/or shock attenuating fluid mounts or similar devices containing hydraulic fluid whose displacement generates inertia and/or damping forces that dramatically affect the stiffness and other properties of the mounts. The invention more particularly relates to improved constructions for fluid mounts and for flow-controlling decoupler assemblies contained therein.

BACKGROUND OF THE INVENTION

Basic constructions and principles of operation of vibration attenuating fluid mounts are disclosed in U.S. Pat. No. 3,202,388 and in the following two articles, the disclosures of which are incorporated herein by reference: Bernuchon, "A NEW GENERATION OF FLUID MOUNTS", SAE Technical Paper Ser. No. 840259 (1984); and Flower, "UNDERSTANDING HYDRAULIC MOUNTS FOR IMPROVED VEHICLE NOISE, VIBRATION AND RIDE QUALITIES", SAE Technical Paper Ser. No. 850975 (1985). Certain of the mounts disclosed in the aforesaid articles include flow-controlling "decoupler" assemblies, which include one of the floating-disc type. This functions in a conventional manner to cause relatively large magnitude damping of excitation impulses of large amplitude, irrespective whether they result in mount compression or mount extension.

The superiority of fluid mounts of the type in question over conventional mounts has been demonstrated in various specific applications, such as in the mounting of engine and other components of motor vehicles, and there is now increasing interest in extending the commercial use of such mounts to many different areas. This has created a need for a fluid mount that may be employed, with only minor modifications or adjustments, in a variety of different applications and environments. If the mount is to possess the desired versatility of utilization, it should be of compact size so as to be usable in locations where space is restricted. The mount should also be of strong and durable construction so as to enjoy a long useful life in large-load, as well as in small-load, applications. The mount should additionally be economical to manufacture, to modify or adjust for a particular application or use, to install, and to service or repair if such should be required.

DESCRIPTION OF THE PRIOR ART

Prior art of possible relevance to the present invention includes that previously cited herein. Additionally, mounts having components of both the elastomeric type and the gas type are disclosed in U.S. Pat. Nos. 4,460,168, 4,546,960, 4,416,445, 4,401,298, 4,352,487, and 4,342,446. The mount of 4,460,168 is specifically intended for mounting of a cab upon a tractor type of motor vehicle and includes, as do the mounts of some other of the aforesaid patents, valve means for causing the damping forces generated during mount retraction or compression to be different from those generated during extension or tensioning of the mount.

U.S. Pat. Nos. 4,262,886 and 4,458,888 disclose fluid mounts having radially extending fluid flow paths.

U.S. Pat. Nos. 3,414,449 and 4,553,290 respectively disclose an elastomeric diaphragm and an elastomeric belt having reinforcing material therein.

SUMMARY OF THE INVENTION

In accordance with one aspect thereof, the present invention provides a highly compact, sturdy, versatile and durable fluid mount that may be economically manufactured and used in a variety of applications and environments. In accordance with another aspect thereof, the invention provides a fluid mount having flow controlling decoupler means that is effective to regulate the movement of hydraulic fluid within the mount in accordance with not only the amplitude of the excitation impulses to which the mount is subjected, but also in accordance with changes in the operating condition of the mount between states of retraction or compression, on the one hand, and tension or extension, on the other hand. In a preferred embodiment thereof, the mount of the present invention includes a generally cylindrical housing having a central axis, an inner wall encircling such axis and defining the periphery of an inner portion of the housing, and a displacer member disposed within the inner portion of the housing and axially moveable relative thereto during operation of the mount. The housing further includes interior flexible means, including at least one rolling diaphragm element, defining contiguous gaseous fluid and hydraulic fluid chambers of variable volume. The hydraulic fluid chamber is disposed primarily within the housing inner portion, and includes first and second sections separated by flow control means that may and preferably does include a novel decoupler assembly. The gas chamber is located within the outer portion of the housing. It encircles the inner housing portion and has a volume which is large in relation to the volume of the hydraulic fluid chamber. During operation of the mount relative reciprocatory movement between its housing and displacer components effects variations in the volume of the hydraulic fluid chamber, which variations are accommodated by compensatory changes in the volume of the gas chamber of the mount. The gas chamber may be open to the ambient atmosphere but normally contains gas under a desired positive pressure, the magnitude of which may be readily varied by use of valve means communicating with the chamber.

The flow-controlling decoupler means of the invention may be and preferably is so constructed as to provide high damping during either large amplitude extension or large amplitude compression of the mount, reduced damping during the other of the aforesaid conditions, and minimal damping when the mount experiences only small amplitude displacements.

DESCRIPTION OF THE DRAWINGS

FIG. 1 is a view in vertical section of a mount in accordance with the present invention;

FIG. 1A is an enlarged fragmentary sectional view of a portion of a diaphragm component of the mount, such portion being encircled and designated 1A in FIG. 1;

FIG. 2 is a horizontal section taken approximately along the line 2—2 through the mount of FIG. 1;

DESCRIPTION OF THE PREFERRED EMBODIMENTS

Figure 3:
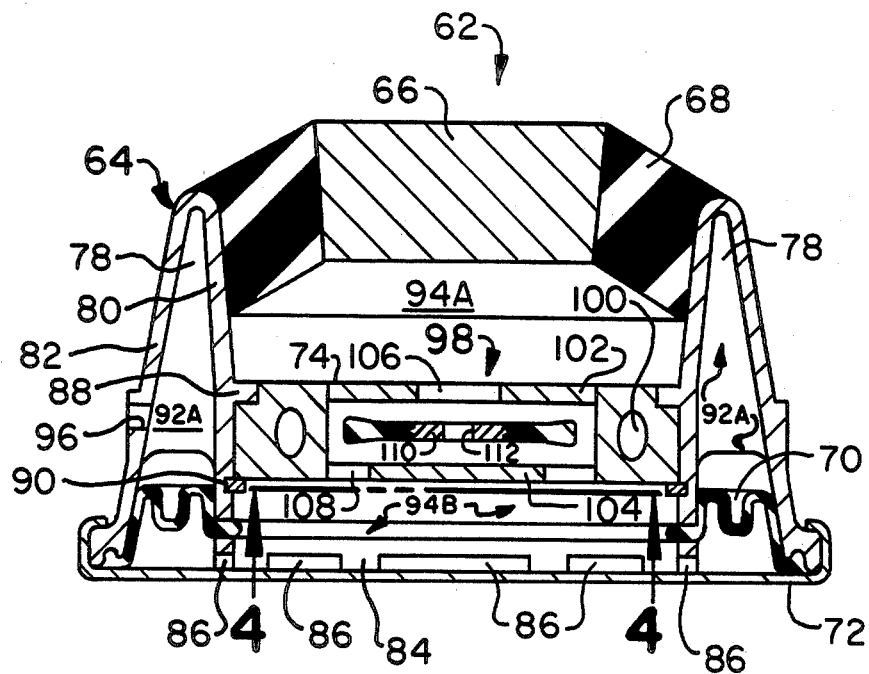
FIG. 3 is a partially schematic view in vertical section of a mount having a decoupler assembly of alternative construction.

The mount 10 shown in FIGS. 1 and 2 is adapted to interconnect, and to attenuate the transmission of vibratory and/or shock forces between, spaced members (not shown) such as the frame and cab components of a truck or other motor vehicle. The mount includes a housing 12 and a displacer element 14 adapted to be fixedly connected to respective ones of the aforesaid members and to undergo, during operation of the mount, relative reciprocatory movement in the direction of the mount's vertical central axis 16. Fluid contained within the mount and displaced by the aforesaid relative movement, in a manner known to those skilled in the art and described more fully hereinafter, generates damping and/or inertia forces that under certain conditions reduce the transmission of vibration and/or shock forces between the members interconnected by the mount.

Housing 12 is of a somewhat tapered but generally cylindrical shape, and of double-wall construction. The housing includes laterally spaced inner and outer side walls 18, 20, respectively, a top wall 22 and a bottom wall 24. Side walls 18, 20 encircle the mount's central axis 16 and a centrally located inner portion 26 of housing 12. Top wall 22 is secured upon the upper end of housing 12 by a peripheral flange 22' that is crimped or otherwise suitably secured in sealing engagement with the enlarged grooved upper edge 20' of outer housing wall 20. Top wall 22 may be and illustratively is provided with means, such as the bolt-receiving blind bores 28 shown in FIG. 1, by which housing 12 may be readily attached to one of the spaced members (not shown) interconnected by mount 10. Bottom wall 24 has a central opening underlying inner housing portion 26. An annular bumper or stop element 29, formed of suitable elastomer or other resilient material, encircles and is fixedly secured to the edge of such opening. Displacer element 14 of mount 10 is disposed within inner housing portion 26 and is fixedly connected to one end of a suitable support shaft 30 extending downwardly through the central opening of bumper 29. The shaft's opposite end (not shown) is suitably affixed to the second one of the spaced members (not shown) interconnected by mount 10. Engagement between bumper 29 and the undersurface of displacer 14 limits extension-type relative axial movement between the displacer and housing 12. By engagement with the periphery of support shaft 30, bumper 29 also restricts any transverse relative movement occuring between displacer 14 and housing 12.

Housing 12 further includes internal variable-volume fluid chambers 32, 34 that are defined in part by rigid portions of the housing, and in part by flexible means in the form of a rolling annular diaphragm 36 and a cup-shaped rolling diaphragm 38. Cup-shaped diaphragm 38 is disposed within inner housing portion 26. The reinforced upper peripheral edge of the diaphragm is clamped between the upper edge of inner housing wall 18 and a cooperating annular channel upon the undersurface of a housing fixture 40 forcibly engaged by housing top wall 22 and having fluid flow control means to be subsequently described. The diaphragm's central portion is bonded or otherwise suitably secured to the upper end of displacer 14, and the rolling lobe of the diaphragm is received within the annular space between the confronting peripheral surfaces of displacer 14 and wall 18. The other diaphragm 36 is disposed within the upper part of the outer portion of housing 12. The enlarged outer edge of the diaphragm is clamped between housing top wall 22 and top edge 20' of housing outer wall 20. The inner edge portion of diaphragm 36 overlies the enlarged upper edge portion of previously-discussed diaphragm 38 and is clamped in place simultaneously therewith, between the upper edge of wall 18 and the grooved undersurface of housing fixture 40, during assembly of fixture 14 and top wall 22 with the remainder of housing 12.

Fluid chamber 32 of housing 12 contains hydraulic fluid (not shown), such as a mixture of water and glvcol, and has first and second sections 32A, 32B that are separated by flow control components of fixture 40. The chamber section 32A is disposed within inner housing portion 26 and is bordered in major part by diaphragm 38. The other chamber section, 32B, is located within the upper part of the outer portion of housing 12. Annular diaphragm 36 constitutes a common boundary between section 32B of chamber 32 and the underlying second fluid chamber 34, which occupies most of the outer portion of housing 12, and which encircles the inner housing portion 26. Chamber 34 contains gaseous fluid (not shown) such as air, which may be under only atmospheric pressure but which would usually be under a positive pressure within the range of 20–120 psi, at least during usage of mount 10 as a vehicle cab mount. Valve means 42 within outer housing wall 20 permits introduction and withdrawl of gaseous fluid into and from chamber 34, and adjustment of the nominal pressure of such fluid when necessary or desired.

At spaced locations about its circumference the outer portion of housing 12 is provided with radially and vertically extending reinforcing elements 44. Each reinforcing element 44 has an inner edge integral with inner housing wall 18, an outer edge integral with outer housing wall 20, and a bottom edge integral with bottom housing wall 24. The upper edge of each element 44 has a concave shape and is spaced sufficiently below diaphragm 36 as to not contact such diaphragm even when its lower portion is downwardly displaced to a maximum extent. There are enough reinforcing elements 44 to insure that housing 10 will safely withstand the external loads and internal pressures to which it is subjected during use of mount 10. For most utilizations, three or four elements 44 are sufficient.

As is indicated in FIG. 1A of the drawings, a layer of reinforcing material 38' is provided within the elastomeric diaphragm 38 engaged by displacer 14. Reinforcing layer 38', which is formed of elongate strand material, is located relatively closely adjacent to the diaphragm's lower surface 38A and relatively distal from the diaphragm's upper surface 38B. Surface 38B is exposed to the hydraulic fluid within chamber 32 and, in the diaphragm lobe portion, is stressed primarily in compression during operation of mount 10. The opposite surface 38A of diaphragm 38 is, in contrast, not exposed to hydraulic fluid and is stressed primarily in tension during mount operation. It has been found that the aforesaid offset location of reinforcing layer 38' in diaphragm 38 results in the diaphragm having a useful life substantially greater than a comparable diaphragm in which the reinforcing layer is located centrally or is offset toward surface 38B. While the other diaphragm 36 may also be provided with a similarly situated reinforcing layer, the need for it is not as great since diaphragm 36 is not stressed as severely as diaphragm 38 during operation of mount 10.

The fixture 40 disposed between chamber sections 32A, 32B includes a bottom wall 46 and upstanding concentric inner and outer walls 48, 50. Wall 50 in effect constitutes an extension of housing wall 18. The upper edge portions of walls 48, 50 are castellated so as to cause the same to possess a plurality of ports 52 disposed at spaced intervals about the entire circumferences thereof. Ports 50 communicate radially with chamber section 32B. Annular wall 48 defines, in association with the central portions of overlying wall 22 and underlying wall 46, the decoupler chamber of a decoupler assembly 54. Assembly 54 further includes a decoupler disc 56 that is moveable vertically within the decoupler chamber between opposite extreme upper and lower positions of engagement with wall 22 and wall 46, respectively. A relatively small diameter passageway 58 extends vertically through the central portion of disc 56, and is aligned with a relatively large diameter central port 60 extending through wall 46 and providing communication between fluid chamber section 32A and the interior of the decoupler chamber.

Hydraulic fluid tends to be displaced from section 32A to section 32B of chamber 32 at such times, during operation of mount 10, as the condition of relative movement between housing 12 and displacer 14 effects mount compression or contraction. Fluid flow in the opposite direction, that is from chamber section 32B to section 32A, tends to occur when the mount is axially tensioned or extended. The decoupler disc 56, through which the hydraulic fluid must pass in either case, is so constructed as to vary the operating characteristics of the mount in accordance with the amplitude of the excitation input forces to which it is subjected, and/or in accordance with whether such input forces produce contraction or extension of the mount. More specifically in the foregoing regard, there is very little if any damping of excitation forces that are of such small amplitude as to result in decoupler disc 56 merely oscillating freely in a vertical direction within the decoupler chamber, without reaching or being maintained in either of its extreme positions of engagement with one or the other of walls 22, 46. In this situation the fluid displacement within chamber 32 is accommodated either by the disc displacement alone, or by the disc displacement in conjunction with relatively free movement of fluid through the annular space between the peripheral edge of disc 56 and the inner cylindrical surface of the decoupler chamber. When the excitation forces are of such relatively large amplitude as to result in vertical displacement of decoupler disc 56 to its extreme positions of engagement with walls 22, 46, relatively high damping of the excitation forces ensue when the same effect extension or tensioning of the mount, while relatively low damping ensues when the excitation forces cause mount compaction or retraction. At the former times, that is during mount extension, the fluid flow from chamber section 32B to chamber section 32A urges decoupler disc 56 into firm engagement with wall 46. All fluid exiting from the decoupler chamber through port 60 must then pass through the relatively small diameter passageway 58 within the disc. This results in a relatively high degree of damping of the excitation force. On the other hand, only relatively low damping occurs when the excitation force is such as to result in mount compaction or retraction, with ensuing displacement of decoupler disc 56 to its uppermost position of engagement with wall 22. In this situation hydraulic fluid can still pass relatively freely from the decoupler chamber to section 32B of fluid chamber 32 via the annular space between the decoupler disc and cylindrical chamber wall, and then via radial ports 52. A differential damping capability of the aforesaid type may be useful in many mount applications. One such application is vehicle cab mounting, wherein it is frequency desired for the damping of road-induced input motions to be relatively small, and the damping of "rebound" motions to be relatively great, or vice-versa. The minimal damping of low amplitude excitations is also beneficial in many utilizations, and is particularly useful in attenuating those excitations of relatively high frequency and low amplitude that otherwise could result in undesirable generation of noise and vibration.

Due to its relatively large size the gaseous fluid chamber 34 undergoes only relatively small percentage changes in volume during operation of mount 10. This, and the absence therein of spring elements of the metal or elastomeric types, enables mount 10 to have a very low spring rate and natural frequency when such are desired. Natural frequencies in the range of 1.0–2.5 Hertz are possible.

Figure 4:
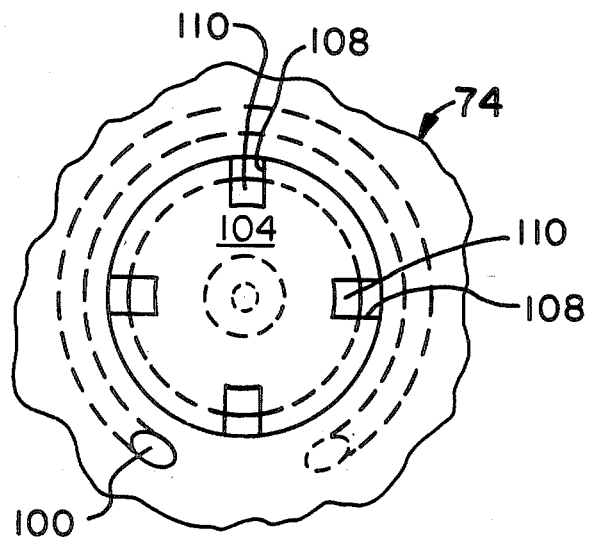
FIG. 4 is a fragmentary bottom plan view taken in the direction of the arrows 4—4, of the decoupler assembly and immediately adjacent components of the mount of FIG. 3.

FIGS. 3 and 4 disclose other embodiments of a mount and a decoupler assembly in accordance with the invention. The mount 62 of FIG. 3 includes a generally cylindrical double-wall housing 64 and a displacer element 66 that are adapted to be affixed to respective ones of a pair of spaced members (not shown) interconnected by the mount, and that during mount operation undergo vertical movement relative to each other. The housing further includes a flexible elastomeric spring element 68 and a flexible rolling diaphragm element 70, each of annular shape; a bottom end wall 72; a flow control fixture 74; and reinforcing members 78 that are integral with and extend between inner and outer annular housing walls 80, 82. Elastomer spring 68 interconnects the upper part of inner housing wall 80 and displacer element 66. Diaphragm 70 has its outer edge portion clamped between the free lower end of outer housing wall 82 and bottom housing wall 72. The inner edge portion of diaphragm 70 is clamped between the free lower edge of inner housing wall 80 and an annular shoulder 84, which contains circumferencial flow ports 86, of bottom- housing wall 72. Flow control fixture 74 is secured within the inner portion of the housing in any suitable manner, as between an annular shoulder 88 and a snap ring 90 connected to and projecting inwardly from inner housing wall 80. Diaphragm 70 constitutes a common boundary between variable volume fluid chambers 92a, 94, the latter of which contains hydraulic fluid and has upper and lower sections 94A, 94B upon opposite upper and lower sides of flow control fixture 74. Chamber 92a is disposed within the outer portion of housing 64, encircles the inner housing portion, and contains gaseous fluid such as air. In some utilizations of mount 67 the air within chamber 94a may be pressurized to a desired extent by suitable valve means, such as designated by the numeral 42 in association with the mount 10 shown in FIG. 1 of the drawings, associated with the chamber. In other utilizations wherein pressurization of the air is not necessary, however, chamber 92 may simply be provided with a vent opening 96 within its outer wall 82. The flow control means associated with fixture 74 includes a decoupler assembly 98 and may further include an elongate slender inertia track passageway 100 communicating at its upper and lower ends with respective sections 94A, 94B of fluid chamber 94. Decoupler assembly 98 includes a decoupler chamber having a top wall 102 and a bottom wall 104, the latter preferably being detachable. Wall 102 has a central port 106 communicating with fluid chamber section 94A. Wall 104 has a solid central portion and a plurality of peripheral ports 108 communicating with chamber section 94B. The decoupler assembly further includes a decoupler disc 110 disposed within the decoupler chamber for floating vertical movement between opposite extreme positions of engagement with walls 102, 104. Disc 110 may be and illustratively is similar to the previously described decoupler disc 56 shown in FIGS. 1 and 2, having a central passageway 112 that is aligned with and of a smaller diameter than the port 106 within upper chamber wall 102.

If the optional inertia track passageway 100 is not associated therewith, decoupler assembly 98 operates in substantially the same manner and produces substantially the same results as the previously described decoupler assembly 54 (FIGS. 1 and 2). Thus, large amplitude excitation forces are damped to a relatively large extent during mount extension, since the hydraulic fluid must then flow through decoupler disc passageway 110 during its passage from chamber section 94B to chamber section 94A. They are damped to only a relatively small extent during mount compression since the fluid passing from chamber section 94A to chamber section 94B may pass relatively freely around the periphery of disc 110 and through ports 108. Inclusion in the mount of optional inertia track passageway 100, which provides a parallel flow path between chamber sections 94A, 94B, modifies but does not change the nature of the foregoing operating characteristics. Differential damping during compression versus extention of the mount by high amplitude excitation forces still occurs, but the magnitudes of the damping forces and/or the frequency ranges over which they are generated are changed by the presence of passageway 100. In keeping with previously described decoupler assembly 54 (FIGS. 1 and 2), assembly 98 causes small amplitude mount excitations to not be damped, or at least to be damped only to a minimal extent. The foregoing is true irrespective of whether the optional inertia track passageway 76 is or is not provided in association with the mount.

It will be apparent that when mount 62 includes optional inertia track passageway 100, the decoupler disc 110 may be of completely solid construction and not have a passageway, such as passageway 112, extending therethrough. In that situation all fluid flow occurring between fluid chamber sections 94A, 94B as a result of mount extension, by relatively high amplitude excitation forces, would be via passageway 100.

The partially "nested" arrangement of the fluid chambers of the present mounts contributes significantly to their compact nature and enables the height thereof to be significantly less than many conventional mounts. Various factors contribute to the durability of the present mounts. These factors include the sturdy double-wall 30 construction of the mount's primary rigid housing components, the "shielded" locations of their flexible chamber-defining components, and/or the location of the reinforcing layer that may be present within one of the latter components. A mount in accordance with the present invention is of relatively simple and inexpensive construction, preferably being comprised of a single casting in association with which the limited number of additional mount components may be quickly and easily assembled. The mounts may be readily adapted, both during and after assembly, for particular differing utilizations. Such adaptation during assembly may be achieved by the selection and use of flow controlling fixtures 40 or 74 having port and/or decoupler components whose dimensions are most appropriate for the particular intended mount useage. Following assembly of the mounts their operating characteristics may if desired be changed by varying the pressure of the air or other gaseous fluid therewithin.

While specific embodiments of the invention have been shown and described, this was for purposes of illustration only, and not for purposes of limitation, and the scope of the invention being in accordance with the following claims.

We claim:

1. A fluid mount or the like for interconnecting spaced members and attenuating the transmission of vibration and/or shock forces therebetween comprising:
   a double-walled housing having a central axis and laterally spaced inner and outer walls, said walls surrounding said axis and an inner portion of said housing;
   a displacer within said inner housing portion;
   said housing and said displacer being adapted to be connected to respective ones of said spaced members and to undergo relative movement along said axis during operation of said mount;
   flexible means disposed within said housing and defining therewith a plurality of variable volume fluid chambers, said chambers including a first chamber containing hydraulic fluid displaceable between first and second sections of said chamber by said relative movement between said housing and said displacer, and said chambers including a second chamber containing gaseous fluid; at least one of said sections of said first chamber being disposed within said inner portion of said housing and surrounding said one of said sections of said first chamber;
   said flexible means including a rolling diaphragm element defining a common boundary between said first and second fluid chamber;
   a flow control means intermediate said first and second sections of said first fluid chamber wherein said flow control means includes a decoupler assembly having a decoupler chamber and first and second port means respectively interconnecting said decoupler chamber with said first and second sections of said first fluid chamber, and a movable decoupler disc disposed within said decoupler chamber for movement between first and second extreme positions respectively adjacent said first and second port means, said disc being effective during large amplitude excitation of said mount to restrict the flow of fluid through said decoupler chamber to a greater extent when in said first of its said extreme positions than when in said second of said extreme positions thereof, and said disc moving freely between positions intermediate said extreme positions thereof when the amplitude of said excitation forces is below said predetermined magnitude.

2. A mount as in claim 1, wherein said diaphragm element is of annular shape.

3. A mount as in claim 2, wherein said diaphragm element is disposed within said outer portion of said housing.

4. A mount as in claim 1, wherein said diaphragm element extends between said inner and outer walls of said housing.

5. A mount as in claim 1, wherein said housing is of generally cylindrical shape.

6. A mount as in claim 5, wherein said housing is tapered in the direction of said central axis thereof.

7. A mount as in claim 1, wherein said flexible means includes a second diaphragm element in addition to said first-mentioned diaphragm element.

8. A mount as in claim 7, wherein at least one of said diaphragm elements is formed of elastomeric material and has a layer of reinforcing material therein; said one diaphragm element being disposed within said central portion of said housing and having one side engaged by said displacer element and an opposite side engaged by said hydraulic fluid, said layer of reinforcing material being disposed closer to said one side of said diaphragm element than to said opposite side thereof.

9. A mount as in claim 8, wherein said elastomeric material adjacent said one side of said diaphragm is stressed primarily in tension during operation of said mount.

10. A mount as in claim 9, wherein each of said diaphragm elements has an edge portion clamped in fluid-tight engagement with an edge portion of the other of said elements.

11. A mount as in claim 10, wherein said housing further includes reinforcing means interconnecting said inner and outer walls, and bumper means carried by said housing adjacent an open end of said inner housing portion for limiting said relative axial movement between said housing and said displacer.

12. A mount as in claim 10, wherein said bumper means also limits transverse relative movement between said housing and said displacer.

13. A mount as in claim 1, wherein said decoupler disc has a passageway extending therethrough, said disc when in said first position thereof requiring fluid exiting from said decoupler chamber through said first port means to pass through said passageway.

14. A mount as in claim 13, wherein said disc when in said second position thereof allows fluid exiting from said decoupler chamber through said first port means to pass about the periphery of said disc.

* * * * *